United States Patent [19]

Takada et al.

[11] 4,062,923
[45] Dec. 13, 1977

[54] PROCESS AND APPARATUS FOR CONTINUOUS PREPARATION OF URANIUM TETRAFLUORIDE

[75] Inventors: Shingo Takada; Ichiro Iwata, both of Kurayoshi, Japan

[73] Assignee: Doryokuro Kakunenryo Kaihatsu Jigyodan, Japan

[21] Appl. No.: 672,533

[22] Filed: Mar. 31, 1976

[30] Foreign Application Priority Data

Oct. 22, 1975  Japan .................. 50-127148

[51] Int. Cl.² ............................................. C01G 56/00
[52] U.S. Cl. ...................................... 423/11; 423/259
[58] Field of Search ................................. 423/259, 11

[56] References Cited

U.S. PATENT DOCUMENTS

| | | | |
|---|---|---|---|
| 2,268,872 | 10/1956 | Klein et al. ........................ | 423/259 |
| 3,065,045 | 11/1962 | Ito et al. ........................ | 423/259 X |
| 3,096,150 | 7/1963 | Allen ................................. | 423/259 |

*Primary Examiner*—Richard E. Schafer
*Attorney, Agent, or Firm*—Wenderoth, Lind & Ponack

[57] ABSTRACT

There is provided a process for continuous preparation of uranium tetrafluoride hydrate which comprises the steps of continuously feeding uranous solution and hydrofluoric acid into the lower section of a reaction vessel to produce crystal particles of uranium tetrafluoride hydrate, causing the crystal particles to float up and be suspended in the upper section of the reaction vessel by agitation; in which section the crystal particles grow and then precipitating and discharging the thus grown crystal particles from the bottom of the vessel, while causing waste solution to overflow from the top of the vessel. There is also provided an apparatus to accomplish the aforementioned process.

5 Claims, 1 Drawing Figure

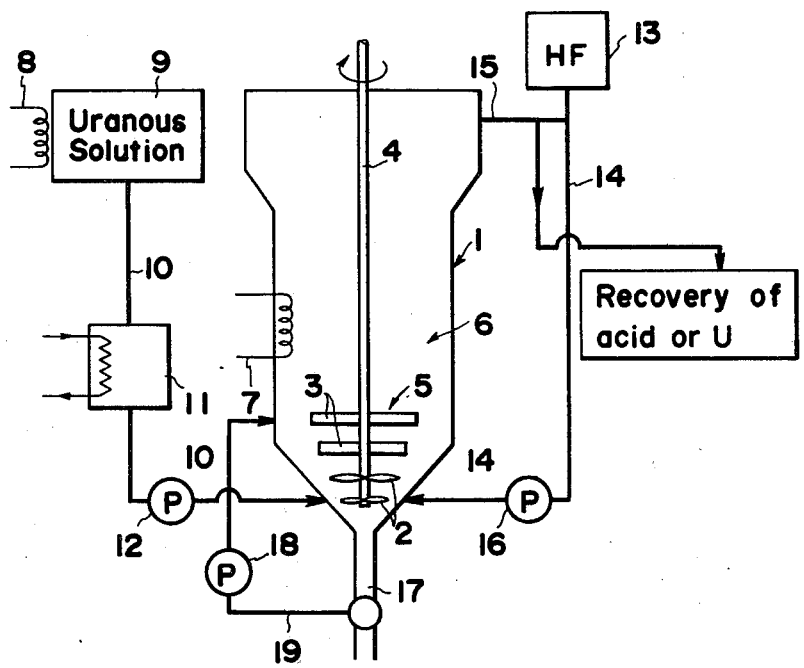

PROCESS AND APPARATUS FOR CONTINUOUS PREPARATION OF URANIUM TETRAFLUORIDE

BACKGROUND OF THE INVENTION

This invention relates to preparation of uranium tetrafluoride ($UF_4$) in a wet process, and more particularly to a process and an apparatus for continuous preparation of uranium tetrafluoride hydrate with coarse particle size.

The known wet process for preparing uranium tertrafluoride is batchwise, which generally comprises the following steps: electrolytically reducing an uranyl chloride solution ($UO_2Cl_2$) obtained in a solvent extraction step into an uranous chloride solution ($UCl_4$), charging the uranous solution into a reaction tank, adding hydrofluoric acid of 50% concentration in the tank to produce and precipitate uranium tetrafluoride hydrate ($UF_4 \cdot nH_2O$), then filtering, washing and drying the thus precipitated uranium tetrafluoride hydrate, and then heating the hydrate by passing nitrogen gas therethrough to remove water of crystallization to thereby obtain anhydrous tertraflouride ($UF_4$).

However, uranium tetrafluoride hydrate from such batch type precipitation method is so small in particle size, which is usually of about 1 to 10$\mu$, that the filtration efficiency is poor. Low efficiency is also unavoidable in the dehydration step and in the conversion step to uranium hexafluoride ($UF_6$) as hereinbelow described, resulting in undesirable pysical properties of the product.

In case of producing metallic uranium by adding magnesium powder to uranium tetraflouride and then heating and fusing the mixture, no impediment is caused even if the uranium tetrafluoride used is of extremely fine particle size. On the other hand, in production of enriched uranium which is currently the main source of nuclear fuel, it is necessary to charge uranium tetrafluoride into a fluidized bed type reaction tower and then to feed preheated fluorine gas into the bottom of the tower to thereby reduce uranium tetrafluoride to hexafluoride ($UF_6$). At this time, if the crystal particles of uranium tetrafluoride are extremely fine, the passage of the fluorine gas is somewhat retarded due to poor fluidity of the particles. In such case, a part of fluorine gas is caused to pass through the tower without undergoing any reaction, resulting in non-uniform reaction and poor utilization of the fluorine gas.

SUMMARY OF THE INVENTION

An object of the present invention is to provide a process for continuous preparation of uranium tetrafluoride hydrate of coarse particle size to thereby overcome disadvantages of the prior art described above.

Another object of the present invention is to provide an apparatus used for practising the above discribed process.

According to the present invention, there is provided a process for continuous preparation of uranium tetrafluoride hydrate comprising the steps of continuously feeding uranous solution and hydrofluoric acid into the lower section of a reaction vessel to produce crystal particles of uranium tetrafluoride hydrate, hydrofluoric acid being fed so as to maintain its concentration in the reaction vessel low in order to avoid extreme supersaturation when hydrofluoric acid contacts the uranous solution, causing the crystal particles thus produced to float up and be suspended in the upper section of the reaction vessel by agitation, and the crystal particles grow in said upper section, the temperature in the reaction vessel being maintained within a range of from about 90° to the boiling point of the solution in the vessel, and then precipitating and discharging the thus grown crystal particles from the bottom of the vessel, while causing waste solution to overflow from the top of the vessel.

According to the present invention, there is also provided an apparatus for continuous preparation of uranium tetrafluoride hydrate comrpising a vertical and substantially cylindrical reaction vessel having means for introducing uranous solution and means for introducing hydrofluoric acid at the lower part thereof and having means to permit overflow at the top thereof, a shaft longitudinally extending in the reaction vessel, at least one propeller-like agitation blade secured to the shaft, at least one plate-shaped agitation blade secured also to the shaft and disposed on the higher level than the propeller-like agitation blade, said agitation blades being arranged in the lower section of the reaction vessel, means for discharging crystal particles of uranium tetrafluoride hydrate produced in the vessel from the bottom thereof, and heating means for maintaining the temperature in the reaction vessel, whereby crystal particles of uranium tetrafluoride hydrate are produced by contacting the uranous solution with hydrofluoric acid in the lower section of the reaction vessel and then causing the thus produced crystal particles to float up and be suspended into the upper section of the vessel by means of the agitation blades. The suspended crystal particles then grow in said upper section to form coarse particles which finally precipitate and are discharged from the bottom of the vessel, while waste solution overflows from the top of the vessel.

A clear understanding of the present invention may be obtained from the following detailed description in conjunction with the accompanying drawing.

DESCRIPTION OF THE DRAWING

The attached FIGURE is a schematic view showing a preferred embodiment of a process and an apparatus according to the present invention.

DETAILED DESCRIPTION OF THE INVENTION

Referring now to the Figure, there is schematically illustrated an embodiment of a uranium tetrafluoride hydrate producing apparatus of the present invention. A vertical and substantially cylindrical reaction vessel 1 includes therein an agitator 5 consisting of propeller-like agitation blades 2 and plate-shaped agitation blades 3 both secured to a shaft 4. The shaft 4 longitudinally extends in the reaction vessel and is rotated by using a motor (not shown). The plate-shaped blades 3 are disposed above the propeller-like blades 2, and these blades 2, 3 are arranged in the lower section of the vessel 1. In this embodiment, two propeller-like blades 2, 2 and two plate-shaped blades 3, 3 are used. However, the number of the blades to be secured to the shaft 4 is not limited in this invention, and one propeller-like blade and one plate-shaped blade may be used. The upper section 6 of the vessel above the agitation blades 3 is provided for growing up particles of uranium tetrafluoride hydrate crystals. The temperature in the vessel 1 can be maintained and controlled by a heater 7.

A pipe 10 extending from an uranous solution tank 9 with a pre-heating means 8 is connected to a lower part of the vessel 1 via a heat exchanger 11 and a pump 12. On the other hand, a pipe 14 extending from hydrofluoric acid tank 13 joins with an overflow pipe 15 for overflowing a waste solution from the top of the vessel 1 and is also connected to a lower part of the vessel 1 via a pump 16. A uranium tetrafluoride discharge pipe 17 is connected to the bottom of the vessel 1.

In operation, when the uranous solution and hydrofluoric acid are continuously introduced into the lower section of the reaction vessel 1 by means of pumps 12 and 16, crystal particles of uranium tetrafluoride hydrate ($UF_4 \cdot nH_2O$) are produced there. Crystal particles thus produced rise or are floated up by the action of the propeller-like agitation blades 2, and are then suspended by the action of horizontal swirling motion induced by the plate-shaped agitation blades 3 disposed on the higher level than the blades 2. The particles floated up and suspended in the upper section 6 of the vessel grow there, and finally precipitate and are discharged from the discharge pipe 17 in the form of pulp, i.e. the mixture of solution and crystal particles.

Waste solution overflows from the top of the vessel 1, and is directed, if required, to a system for recovering uranium constituent still remaining therein or by-products, such as hydrochloric or sulfuric acid are recovered.

Preferably, the bottom of the reaction vessel 1 has a conical shape which protrudes downwardly, so as to permit the precipitated particles to slide into discharge pipe 17.

If necessary, pipe 19 may branch off from the discharge pipe 17 and be connected to the mixing part of vessel 1 via a pump 18 so as to recycle the once precipitated crystal particles into the upper section of the vessel where the crystal particles are grown.

It has been found that, in order to properly accomplish such growth of the uranium tetrafluoride hydrate crystals, it is required to keep the hydrofluoric acid concentration in the reaction vessel as low as possible so as to avoid extreme supersaturation when hydrofluoric acid contacts with the uranous solution. Therefore, in the embodiment shown in the FIGURE, a 50% concentration hydrofluoric acid is diluted to approximately 5 to 15% with the overflowing waste solution, and the thus diluted hydrofluoric acid is introduced into the reaction vessel. The concentration of hydrofluoric acid in the reaction vessel may be controlled by the flow rate of hydrofluoric acid and uranous solution, and by adjusting the concentration of hydrofluoric acid to be fed. Good test results have been obtained when the concentration of hydrofluoric acid in the reaction vessel has been maintained at about 0.2 to 0.3 percent.

In this invention, it is necessary to maintain the temperature in the reaction vessel, especially in the upper section thereof, at a relatively high level in order to produce a suitable type of hydrate and to obtain coarse crystal particles. When the reaction temperature is within the range of from normal temperature to about 50° C, the a 2½ hydrate salt of uranium tetrafluoride ($UF_4 \cdot 2\frac{1}{2}H_2O$) is generally produced. This 2½ hydrate salt undergoes the following hydrolytic reactions in the succeeding dehydration step:

$$UF_4 + 2H_2O \rightarrow UO_2 + 4HF$$

$$UF_4 + 2H_2O \rightarrow UO_2F_2 + 2HF$$

These hydrolytic reactions result in increase of $UO_2$ or $UO_2F_2$ to make dehydration insufficient. On the other hand, if the reaction temperature is controlled at above 90° C, there is produced ¾ hydrate salt ($UF_4 \cdot \frac{3}{4}H_2O$) which can be properly dehydrated while undergoing almost no hydrolysis in the succeeding dehydration step. Our test result indicates that ¾ hydrate salt allows dehydration to as low as less than 0.1% water content. The solution in the reaction vessel will usually boil at around 96° C (at 0.917 atm), so that the reaction temperature should be within a range of from about 90° C to a boiling temperature of the solution, preferably from 92° to 94° C.

Thus, where the precipitated crystal particles obtained were of the size from 40 to 140μ, the pulp density discharged amounted to 65 to 75% solids content (apparent specific gravity of the pulp is 1.9 to 2.9 g/cc, and the true specific gravity of the particles is 6.5 to 7.0 g/cc). When filtration of this pulp was conducted by using a pan filter, there resulted an extremely high filtration efficiency, and the water content of the cake thus obtained could be easily squeezed down to about 5%.

The following examples are presented by way of illustration only and are not intended as limitation of this invention.

EXAMPLE

In the examples, both an uranous chloride solution and an uranous sulfate solution are used as the uranous solution. Uranium tetrafluoride hydrate is produced according to the following reactions:

$$UCl_4 + 4HF \rightarrow UF_4 \cdot nH_2O \downarrow + 4HCl$$

$$U(SO_4)_2 + 4HF \rightarrow UF_4 \cdot nH_2O \downarrow + 2H_2SO_4$$

Conditions and results of tests are summarized in the following table.

| Test No. | Uranous used | Concentration of HF to be fed | Flow Rate | | Temp. | Average Particle size |
|---|---|---|---|---|---|---|
| | | | Uranous | HF | | |
| | | g/l | l/min | ml/min | ° C | μ |
| 1 | $UCl_4$ | 100 | 2.0 | 640 | 93 | 100 |
| 2 | $UCl_4$ | 101.9 | 2.0 | 353 | 94 | 70 |
| 3 | $U(SO_4)_2$ | 120.3 | 2.0 | 163 | 93 | 100 |

As is apparent from the test results shown in the table, even when using the uranous sulfate solution, there takes place desired crystal growth under the same conditions as when using the uranous chloride solution.

It will be seen from the foregoing description and examples that the process and the apparatus according to the present invention is capable of continuously obtaining crystals of uranium tetrafluoride hydrate with relatively large particle size, and hence the filtration efficiency is extremely high. Futhermore, when the thus prepared uranium tetrafluoride hydrate is reacted, in the succeed process, with fluorine gas in the fluidized bed reaction tower to produce uranium hexafluoride, uniform fluorination can be accomplished with improved efficiency of fluorine gas utilization, due to excellent fluidity and effective passage of fluorine gas.

What we claim is:

1. A process for continuous preparation of uranium tetrafluoride hydrate crystal particles of coarse size comprising the steps of:

continuously feeding a uranous solution selected from the group consisting of uranous chloride solution and uranous sulfate solution and hydrofluoric acid into the lower section of a reaction vessel to produce crystal particles of uranium tetrafluoride hydrate, said hydrofluoric acid concentration in the reaction vessel being maintained sufficiently low to avoid extreme supersaturation when hydrofluoric acid contacts the uranous solution;

floating up and suspending the crystal particles thus produced into the upper section of the reaction vessel by the action of agitation and permitting the crystal particles to grow in said upper section, the temperature in the reaction vessel being maintained within a range of from about 90° C to the boiling point of the solution in the vessel; and then precipitating and discharging the thus grown crystal particles from the bottom of the vessel, while causing waste solution to overflow from the top of the vessel, thereby obtaining uranium tetrafluoride $\frac{3}{4}$ hydrate crystal particles of from about 40 to 140μ.

2. The process according to claim 1, wherein the crystal particles discharged from the reaction vessel are recycled to the reaction vessel and subjected again to the crystal growing step.

3. The process according to claim 1, wherein the waste solution overflowed is reused to dilute hydrofluoric acid and is recycled to the reaction vessel together with said hydrofluoric acid.

4. The process according to claim 1, wherein a concentration of hydrofluoric acid to be fed into the reaction vessel is 5 to 15%.

5. The process according to claim 1, wherein the concentration of hydrofluoric acid in the reaction vessel is maintained at about 0.2 to 0.3 percent.

* * * * *